Aug. 24, 1965  S. S. BRAUN ETAL  3,202,732
REPAIRING REFRACTORY LINED VESSELS
Filed May 14, 1962

INVENTORS:
STEVEN S. BRAUN
LE ROY H. MARKWAY
DONALD O. CHRISMER
JOHN W. BURKS

BY: *H. D. Burch*
THEIR ATTORNEY ns patent
3,202,732
Patented Aug. 24, 1965

3,202,732
REPAIRING REFRACTORY LINED VESSELS
Steven S. Braun, Le Roy H. Markway, and Donald O. Chrismer, Houston, and John W. Burks, Pasadena, Tex., assignors to Shell Oil Company, New York, N.Y., a corporation of Delaware
Filed May 14, 1962, Ser. No. 194,366
6 Claims. (Cl. 264—30)

This invention relates to the patching of linings in metallic vessels and is particularly concerned with the repairing of defects in the internal insulating refractory lining of steel vessels through which a hot material is circulating. The refractory walls of such vessels as catalyst regenerators are particularly subject to cracks, fissures or openings developing in the refractory lining.

In the catalytic cracking process for the conversion of heavy oils into lighter and more valuable hydrocarbons, oil is brought into intimate contact with hot powdered catalyst in a reactor. As a result of this, carbonaceous material is deposited on the surface of the catalyst, reducing its activity. It is, accordingly, desirable to regenerate the catalyst so that it may be used repeatedly. For this operation it is a practice to continuously remove catalyst from the reaction vessel and transport it by way of a steam stripper vessel into a catalyst regenerator. The stripped spent catalyst passes into the regenerator by gravity flow and forms a bed therein. Air is delivered to the regenerator by an air blower and is distributed through the catalyst bed. Combustion of the coke or carbon on the catalyst takes place in the regenerator; flue gases leaving the top of the regenerator. The regenerated catalyst is drawn off from the bottom of the regenerator and passes down a regenerator downpipe to the bottom of a reactor riser where it meets fresh feed and the cycle is re-commenced. Owing to the high temperature in the regenerator, for example, 1200–1300° F., and the constant movement of the catalyst bed, cracks in the refractory lining can occur. These cracks can develop into eroded areas between the steel wall of the regenerator shell and the refractory lining. As a result, hot catalyst circulates between the refractory and the steel shell causing "hot spots." The presence of these "hot spots" has resulted in the premature shutdown of catalytic cracking units, necessitating external safety measures to be taken, and requiring extensive internal repairs after a unit is shut down.

It is therefore an object of this invention to provide a method for repairing damage to the insulating refractory linings of pressure vessels such as catalytic cracking regenerators without interruption of the process.

According to the invention, the steel outer wall of the vessel is hot tapped, the hot spot cooled by injection of a gaseous stream and hydraulic setting material injected from outside the vessel wall into voids and cracks in the refractory material.

Further advantages and features of the invention will be understood from the following detailed description of the process and the apparatus therefor throughout which description reference is made to the accompanying drawing.

Figure 1:
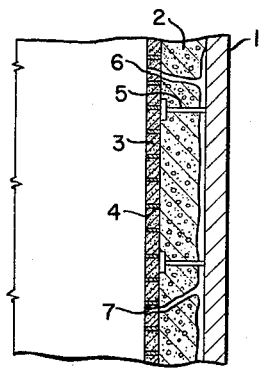
FIG. 1 is a vertical sectional view of part of the wall of a catalytic cracking catalyst regenerator vessel showing fissures in the refractory lining and areas void of refractory lining.

Referring to the drawing, numeral 1 indicates the steel outer pressure sustaining wall of a catalyst regenerator vessel, 2 is the usual insulating refractory lining which is applied to the inside of the steel wall, 3 indicates a dense refractory inner lining having an expanded metal base 4. Hangers 5 attach the expanded metal to the steel wall at intervals.

In the drawing there is illustrated cracks 6 and 7 in the refractory linings 2 and 3. When such cracks develop, pressure and temperature stresses on the steel outer wall of the vessel result in further separation of the lining 2 from close contact with the steel wall 1. In a very short time, the catalyst begins to circulate in the space between the lining 2 and the steel wall 1. Erosion of the lining 2 thereafter takes place. The contact of the hot contents of the regenerator can raise the skin temperature of the regenerator in the "hot spots" area from a normal temperature of about 250° F. to 700–1200° F. According to our process the hot spot is eliminated using the apparatus shown in FIG. 2 connected to the wall of the vessel.

Figure 2:
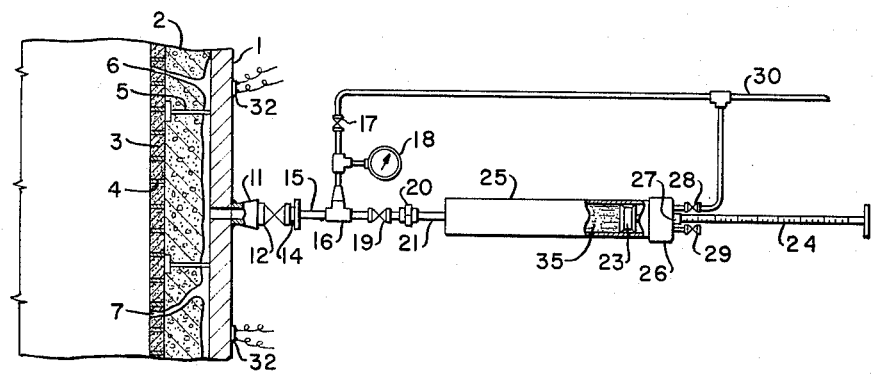
FIG. 2 is a similar view to that of FIG. 1 with apparatus attached, for the necessary repair work.

Referring to the FIG. 2, a nozzle 11 and attached valve 12 are first installed on the wall 1 preferably at the center of the hot spot area by welding the nozzle 11 to the steel shell 1. A hole is then drilled through the wall of the vessel, the drill bit being fed through the valve 12 (in open position) and the inside of the nozzle 11. After the vessel wall has been tapped and the drill removed, the valve 12 is closed and a screwed bushing 14 is screw-threaded into the unattached side of the valve 12. A short pipe nipple 15 connects the screwed bushing 14 to a pipe T 16. One arm of the T 16 is connected to one side of a gate valve 17. A pressure gauge 18 is connected into said arm by a T fitting between the gate valve 17 and the T 16, as will be seen from the drawing.

The third arm of the T 16 is connected to one side of a quick-action valve 19. The other side of the valve 19 is connected by means of a union 20 and pipe nipple 21 to the end of an extrusion gun which comprises a movable piston 23, having a piston rod 24 slidably mounted in a cylinder 25. A pipe cap 26 is threadedly mounted on the unattached end of the cylinder and is arranged so that the piston rod 24 passes through its center through a suitable gland fitting 27. The pipe cap 26 is fitted with two gate valves 28 and 29. The prior described valve 17 and the valve 28 on the pipe cap 26 are attached by suitable air hose 30 to a source of air under pressure. Thermocouples 32 are attached to the outside wall in the area of the hot spot.

The above-described extrusion gun is filled with a suitable hydraulic cement 35 in the usual manner after unscrewing the pipe cap 26 with its associated piston 23, graduated piston rod 24 and removing these from the cylinder 25. We have found that one of several suitable materials is a sodium silicate composition marketed under the trademark "Penseal" by Harbinson-Walker Refractories Co. of Pittsburgh, Pennsylvania. One or more thermocouple units 32 are attached to the outside wall of the vessel 1 in the "hot spot" area.

With the apparatus set up as above-described, and the extrusion gun loaded, the further steps in the process can be effected. The valve 12 close to the vessel is opened, and with valves 17, 19, 28 and 29 closed, the pressure in the vessel (usually about 10–20 p.s.i.) is registered on the pressure gauge 18. The valve 17 is next gradually opened until a pressure of 8–10 p.si. over the first-noted pressure is obtained. Air at ambient temperature is then passed into the regenerator through valve 12 and nozzle 11 until the hot spot area has been cooled to a temperature in the range of about 290° F. to 140° F. The length of this cooling period will, of course, vary depending upon the volume and temperature of air injected, the area of the hot spot, the initial temperature of the hot spot, and other factors. We have found that sufficient cooling in many cases can be obtained when air has been injected as above for a period of about 20 minutes. Sufficient cooling having been achieved, the air valve 28 is then opened to supply full plant air pressure (about 100 p.s.i.g.) to the piston 23 in the cylinder 25 which is filled with the hydraulic cement. The quick-acting valve 19 is next gradually opened alowing the hydraulic cement to flow slowly into the catalyst regenerator vessel. This operation is continued slowly until the entire contents of the cylinder 25 has been ejected. The valve 17 in the branch air connection is closed as soon as there is an indication, by means of graduated piston rod 24, that the cement has reached the nozzle 11. After the contents of the cylinder has been ejected the valve 12 is closed and the apparatus disassembled. The valve 12 should thereafter be plugged as a safety measure. Temperature indications from the thermocouples 32 will show whether the whole of the area of the hot spot has been protected by the injection.

In general, we have found that when the thermocouples show a stabilized temperature of about 250–300° F. that a repair can be considered as completely effected.

In some cases it may be necessary to use more than one tapping, cooling and injection procedure. Such multiple tapping, cooling and injection operations, are considered within the scope of our invention.

We have found that the cooling of the hot spot prior to injection of the compound is most important. Such cooling prevents the rapid flashing of solvents and diluents in the injected compound. Without the temperature of the walls of the area to be repaired being reduced, the generation of vapors from the cement might damage or blow off existing refractory panels. Such rapid generation of vapor further creates voids in the injected material and reduces adhesion to the steel shell and to the existing refractory. The injection of the cooling air also serves to stop the circulation of catalyst between the steel wall and the refractory and to remove catalyst particles in the inter-wall area.

While we have employed air in the operations described it should be understood that in repairing linings in other steel vessels at high temperature and under pressure it may be necessary to use another gas such as nitrogen or carbon dioxide for the cooling and for the injection of the hydraulic cement. For example, in repairs to the walls of vessels containing reacting hydrocarbons in a non-oxidizing atmosphere, injection of air would be extremely hazardous and might lead to fatal results. While we have used compressed air at about ambient temperature with satisfactory results, we also contemplate the use of air and other gases cooled below ambient temperature to effect a more rapid cooling of the hot spot area where it is necessary or desirable. Although particular materials, methods and apparatus embodying the present invention have been described in detail herein with reference to the accompanying drawing, it should be understood that such embodiments are illustrative and that various changes and modifications may be made without departing from the scope of the invention defined in the appended claims.

We claim as our invention:

1. The method of patching a hot vessel having an outer steel wall and an inner refractory lining, said vessel being in operation normal in service temperature and pressure, said method comprising tapping the steel wall of said vessel at a point where the outside surface of the steel wall has developed a hot spot while the vessel is under operating conditions normal as to temperature and pressure, injecting a cooling gas into the vessel and through the opening made in said vessel wall by said tapping and flowing said gas through the wall and into the voids of the material adjacent the steel wall to substantially reduce the steel wall temperature around the tapped point and the temperature of the material adjacent the steel wall to a temperature at which repairs may be carried out, and thereafter injecting by pressure means a flowable aqueous refractory material through said opening and into the voids of said refractory material from the back sides thereof.

2. The method as defined in claim 1 in which the cooling gas is air.

3. The method as defined in claim 1 in which the cooling gas is nitrogen.

4. The method as defined in claim 1 in which the cooling gas is carbon dioxide.

5. The method as defined in claim 1 in which the flowable refractory material is a hydraulic cement containing sodium silicate.

6. The method as described in claim 1 in which the gas is injected at a pressure of 8–10 p.s.i. above the pressure of the vessel.

References Cited by the Examiner

UNITED STATES PATENTS

| | | | |
|---|---|---|---|
| 350,981 | 10/86 | Kennedy | 264—30 |
| 609,733 | 8/98 | Coker | 25—155.5 |
| 1,883,196 | 10/32 | Wertz | 18—59 |
| 1,953,452 | 3/34 | Wertz | 18—59 |
| 2,313,110 | 3/43 | Wertz | 18—59 |
| 2,348,395 | 5/44 | Larson | 25—155.5 |
| 2,407,725 | 9/46 | Schoenlaub | 25—155.5 |
| 2,968,083 | 1/61 | Lentz et al. | 25—155.5 |

ROBERT F. WHITE, *Primary Examiner.*

MORRIS LIEBMAN, ALEXANDER H. BRODMERKEL, *Examiners.*